(12) United States Patent
Vankamamidi et al.

(10) Patent No.: US 12,112,039 B2
(45) Date of Patent: Oct. 8, 2024

(54) COMBINING XCOPY'S, UNMAPS, AND WRITES IN A SINGLE FLUSH

(71) Applicant: Dell Products L.P., Round Rock, TX (US)

(72) Inventors: Vamsi K. Vankamamidi, Hopkinton, MA (US); Socheavy Heng, Framingham, MA (US); Nimrod Shani, Raanana (IL)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/156,683

(22) Filed: Jan. 19, 2023

(65) Prior Publication Data

US 2024/0248600 A1    Jul. 25, 2024

(51) Int. Cl.
*G06F 12/00* (2006.01)
*G06F 3/06* (2006.01)

(52) U.S. Cl.
CPC ............ *G06F 3/0604* (2013.01); *G06F 3/064* (2013.01); *G06F 3/065* (2013.01); *G06F 3/067* (2013.01)

(58) Field of Classification Search
CPC ........ G06F 3/0604; G06F 3/064; G06F 3/065; G06F 3/067
USPC ....................................................... 711/154
See application file for complete search history.

(56) References Cited

U.S. PATENT DOCUMENTS

| | | | |
|---|---|---|---|
| 9,696,919 B1 | 7/2017 | Vankamamidi et al. | |
| 9,916,112 B1 | 3/2018 | Taylor et al. | |
| 10,146,454 B1 | 12/2018 | Koli et al. | |
| 10,318,178 B1 | 6/2019 | Feng et al. | |
| 11,366,594 B2 | 6/2022 | Ruff et al. | |
| 11,556,262 B2 | 1/2023 | Hang et al. | |
| 2017/0024140 A1* | 1/2017 | Shivanand | G06F 3/065 |
| 2018/0124157 A1* | 5/2018 | Gao | G06F 3/0665 |

FOREIGN PATENT DOCUMENTS

AU    2015240901 B2 *  9/2017 ............. G06F 9/466

OTHER PUBLICATIONS

Shani, Nimrod, et al.; "Metadata-Based Data Copying," U.S. Appl. No. 17/870,992, filed Jul. 22, 2022.

* cited by examiner

*Primary Examiner* — Mardochee Chery
(74) *Attorney, Agent, or Firm* — BainwoodHuang

(57) ABSTRACT

A technique for managing a log in a storage system includes adding descriptors to the log, the descriptors indicating changes in user data that affects metadata, and creating a working set of descriptors that includes both per-block descriptors for specifying per-block changes and per-extent descriptors for specifying per-extent changes, where an extent includes a range of contiguous blocks. The technique further includes flushing the working set in a single flush cycle, including flushing the per-block descriptors together with the per-extent descriptors.

20 Claims, 6 Drawing Sheets

COMBINING XCOPY'S, UNMAPS, AND WRITES IN A SINGLE FLUSH

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some storage systems use logs to store changes in data and/or metadata temporarily until such changes can be flushed to persistent data structures. For example, a log may be constructed as a ring buffer, having a head and a tail, in which changes (e.g., writes, x-copy's, unmaps, etc.) may be applied to the head of the log and flushed from the tail. A typical log accepts changes at per-block granularity, meaning that individual entries (e.g., descriptors) are written to the log for respective blocks. A "block" is a unit of allocatable storage space. Different systems may use different block sizes, with typical block sizes being 4 kB (kilobytes), 8 kB, 16 kB, 64 kB, or the like. In a system having a 4-kB block size, a single 4-kB write may be recorded in a single log entry. Likewise, a single 4-kB x-copy or unmap may be recorded in another log entry. As is known, "x-copy" is a SCSI (Small Computer Systems Interface) command for logically copying data from a specified source range to a specified destination range, while "unmap" is a SCSI command that frees mapping pointers associated with a logical address and causes data read from that address to be zero.

Logs provide an expedient way of storing changes in data. They also enable consistency to be maintained in the event of a system failure or reboot. For example, certain changes in a log may be persisted, such that in the event of an unexpected reboot, changes in the log can be read from persistent storage and replayed once the system is running again. This arrangement ensures that no changes are lost.

SUMMARY

Recently, efforts have been underway to support log entries that specify changes at larger granularity than the customary per-block granularity. For example, some types of log entries can now specify changes at per-extent granularity, where an "extent" is a contiguous range of logical addresses, which encompasses many blocks. An extent may be defined, for example, as 128, 256, 512, 1024, or some other number of contiguous logical block addresses (LBAs), where each LBA corresponds to a respective block.

Unfortunately, providing both per-extent entries and per-block entries together in the same log presents challenges when flushing entries from the log. For example, the log may include a first entry that specifies a change in an extent of LBAs and a second entry that specifies a change in a single block within that same extent of LBAs. Until now, such challenges have been managed by separating the two log entries into respective flush cycles. For example, if the extent-level change occurred first in time and the block-level change occurred second, a storage system would flush the extent-level change in one flush cycle and flush the block-level change in a later flush cycle. This approach is inefficient, however, as it complicates the flushing process and makes it more likely that flushing will become a bottleneck for storage-system performance. What is needed, therefore, is a way of combining log entries specifying extent-level changes with log entries specifying block-level changes in a single flush cycle.

To address this need at least in part, an improved technique for managing a log in a storage system includes adding descriptors to the log, the descriptors indicating changes in user data that affects metadata, and creating a working set of descriptors that includes both per-block descriptors for specifying per-block changes and per-extent descriptors for specifying per-extent changes, where an extent includes a range of contiguous blocks. The technique further includes flushing the working set in a single flush cycle, including flushing the per-block descriptors together with the per-extent descriptors.

In some examples, the improved technique includes identifying and resolving duplicate changes in LBAs among the per-block and per-extent descriptors, enabling per-block changes and per-extent changes to the same LBAs to be flushed in parallel. In other examples, the improved technique includes identifying descriptors that must be flushed separately, based on data dependencies, and assigning such descriptors to separate flush cycles, thereby avoiding data corruption.

Advantageously, the improved technique allows the mixing of per-block descriptors with per-extent descriptors in a single flush cycle, thereby enhancing parallel processing and avoiding bottlenecks, while at the same time enforcing data dependencies and avoiding corruption.

Certain embodiments are directed to a method of managing a log. The method includes adding log descriptors to the log, the log descriptors including a first plurality of descriptors that specify changes in respective, individual blocks and a second plurality of descriptors that specify changes in respective extents, each extent including multiple blocks having contiguous LBAs (logical block addresses). The method further includes creating a working set of descriptors that includes both a first set of descriptors selected from the first plurality of descriptors and a second set of descriptors selected from the second plurality of descriptors. The method still further includes flushing, in a single flush cycle, the working set to persistent structures to implement the changes specified by the first set of descriptors and the second set of descriptors.

Other embodiments are directed to a computerized apparatus constructed and arranged to perform a method of managing a log, such as the method described above. Still other embodiments are directed to a computer program product. The computer program product stores instructions which, when executed on control circuitry of a computerized apparatus, cause the computerized apparatus to perform a method of managing a log, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing a log in a storage system includes adding descriptors to the log, the descriptors indicating changes in user data that affects metadata, and creating a working set of descriptors that includes both per-block descriptors for specifying per-block changes and per-extent descriptors for specifying per-extent changes, where an extent includes a range of contiguous blocks. The technique further includes flushing the working set in a single flush cycle, including flushing the per-block descriptors together with the per-extent descriptors. Advantageously, the improved technique allows the mixing of per-block descriptors with per-extent descriptors in a single flush cycle, thereby enhancing parallel processing and avoiding bottlenecks, while at the same time enforcing data dependencies and avoiding corruption.

Figure 1:
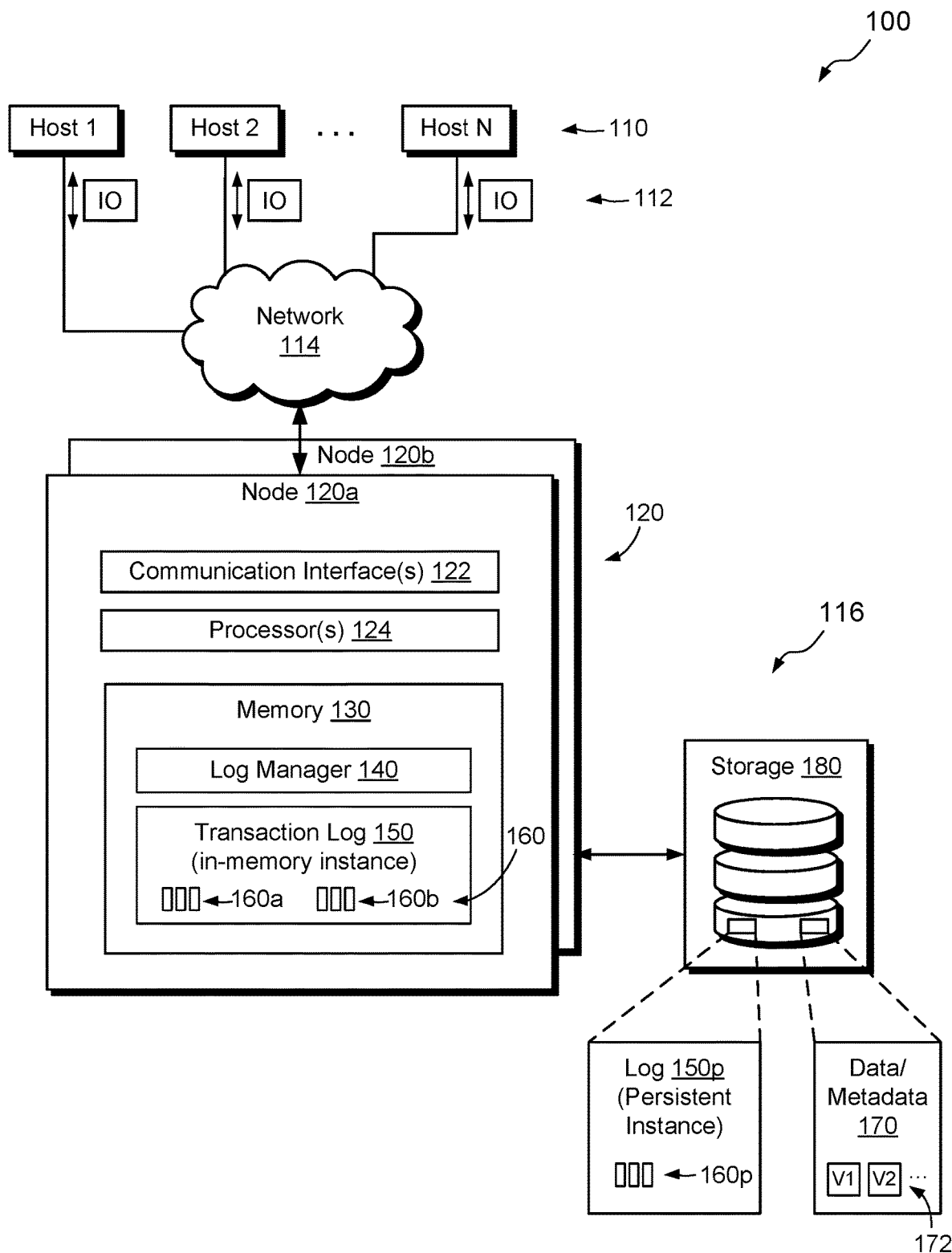
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 180, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Nonvolatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 180.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a log manager 140 and a transaction log 150. The log manager 140 is a program (e.g., a set of software components) configured to manage the transaction log 150. The transaction log 150 is configured to receive and organize descriptors 160, i.e., records of changes in data and/or metadata in the storage system 116, which changes arise from storage operations, such as writes, unmaps, x-copy's, snapshots, and the like. The descriptors 160 may include per-block descriptors 160a, which specify changes in individual blocks, as well as per-extent descriptors 160b, which specify changes in extents, i.e., ranges of contiguous blocks. In some examples, the descriptors 160 further include per-object descriptors (not shown), such as those which apply to entire volumes or snapshots. As a non-limiting example, if the block size of the storage system 116 is 4 kB and the extent size is 1 MB (megabyte), then there would be 256 blocks per extent and the x-copy destination range would cover four extents.

The log 150 is an in-memory instance, and a corresponding persistent instance 150p of the log may reside in storage 180, or elsewhere, such as in a separate set of NVMe drives (not shown). The persistent instance 150p of the log enables recovery from a system failure or reboot. For example, persisted descriptors 160p may be loaded, after a reboot, into memory 130 from the persistent instance 150p and associated transactions may be replayed to ensure that all changes specified in the log are implemented, and thus that no data are lost. The persistent log 150p may be mostly if not entirely identical to the in-memory log 150. However, the two instances may be allowed to differ for the sake of efficiency, provided that the differences do not impair the ability of the storage system 116 to recover using the persistent instance 150p of the log.

The storage 180 may further contain various persisted data and metadata 170. For example, the storage system 116 may store host data in the form of volumes 172 (e.g., V1, V2, etc.), where the volumes support a variety of host-accessible data objects, such as LUNs (logical units), file systems, virtual machine disks, or the like. The storage system 116 also provides various metadata for describing and organizing the volumes. Examples of such metadata include mapping pointers and block virtualization structures (not shown). In an example, each volume is composed of multiple blocks and each block has an associated LBA.

In example operation, the hosts 110 issue I/O requests 112 to the data storage system 116. The node 120 receives the I/O requests 112 at the communication interfaces 122 and initiates further processing. Such processing may include forming transactions that describe changes in data and/or metadata, such as changes arising from writes, unmaps, x-copy's, snapshots, and the like, and recording those transactions at least in part using descriptors 160 in the log 150. The descriptors 160 are compact data structures that store basic information about transactions. In some examples, more detailed information about transactions may be stored separately, e.g., in separate data structures (not shown). In general, descriptors 160 added to the log 150 are mirrored to the persistent instance 150p of the log, to support recovery.

Figure 2:
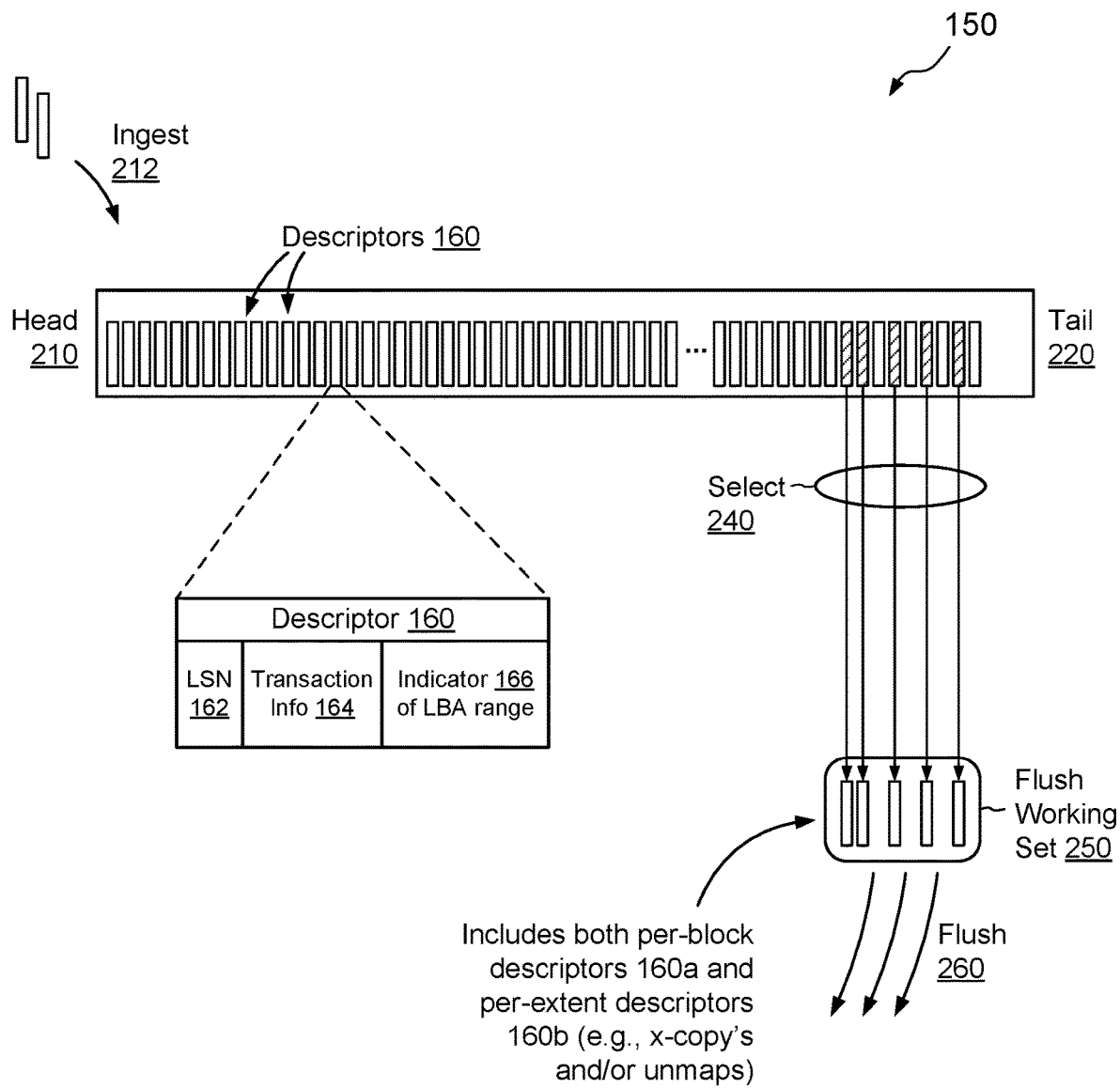
FIG. 2 is a block diagram showing an example arrangement for managing a transaction log of FIG. 1.

FIG. 2 shows an example of the log 150 and its operation in greater detail. Here, a typical descriptor 160 is seen to include a sequence indicator 162, such as a log sequence number (LSN). LSN's are assigned as monotonically increasing numbers and thus enable descriptors 160 to be time-ordered within the log 150. A typical descriptor 160 further includes transaction information 164, e.g., an indicator of the type of transaction (e.g., write, x-copy, unmap, snapshot, etc.), which may be indicated directly or by reference, and an indicator 166 of an LBA range. For per-block descriptors 160a, the LBA range may be a single LBA, which identifies a single block to be affected. For per-extent block descriptors 160b, the LBA range may indicate one or more extents, where each extent is a contiguous range of blocks. For compactness, the descriptor 160 need not store the LBA range directly but may instead provide a reference to the LBA range, which may be stored elsewhere.

In the example shown, the log 150 is a circular log (ring buffer) having a head 210 and a tail 220. Descriptors 160 are added to the head 210 (ingest 212) and are flushed from tail 220 (flush 260). Flushing a descriptor 160 has the effect of implementing the change or changes specified by that descriptor in the data and/or metadata 170.

To prevent the log 150 from running out of space and creating a performance bottleneck, it is essential that flushing 260 be performed quickly and efficiently. This generally means combining all descriptors that can feasibly be combined and flushing the combined descriptors together in parallel.

In an example, flushing from the log 150 proceeds in cycles. During each cycle, log manager 140 creates a working set 250 of descriptors 160 that may be flushed together at once and directs multiple workers (e.g., threads or "minions") to flush the working set 250 all at once in parallel. For efficiency, log manager 140 may assign descriptors 160 to minions based on LBA range. Once a current flush cycle is complete, another flush cycle is begun, and the process of flushing in cycles may continue indefinitely.

To form a working set 250, log manager 140 selects 240 a typically large number of descriptors 160 close to the tail 220. The selected descriptors for the working set 250 may include both per-block descriptors 160a and per-extent descriptors 160b.

The selected descriptors may include multiple descriptors that affect the same LBA range, provided that the changes indicated by the descriptors can be resolved and do not require dependency ordering. For example, a per-extent x-copy descriptor can be flushed together with a per-block descriptor that affects a block within the destination LBA range of the indicated x-copy. Likewise, a per-extent unmap descriptor can be flushed together with a per-block descriptor that affects a block within the LBA range of the indicated unmap. Examples that follow provide more detail as to how such resolution can be achieved.

The log manager 140 may however, assign descriptors to different working sets 250 based on dependencies, which if violated could cause data corruption. For example, it may be necessary to flush a per-block write descriptor separately from a subsequent x-copy descriptor if the LBA of the per-block descriptor falls within the source range of the x-copy. In the absence of such separation, the x-copy could produce unpredictable results, depending on whether the write is performed before or after the x-copy.

Figure 3:
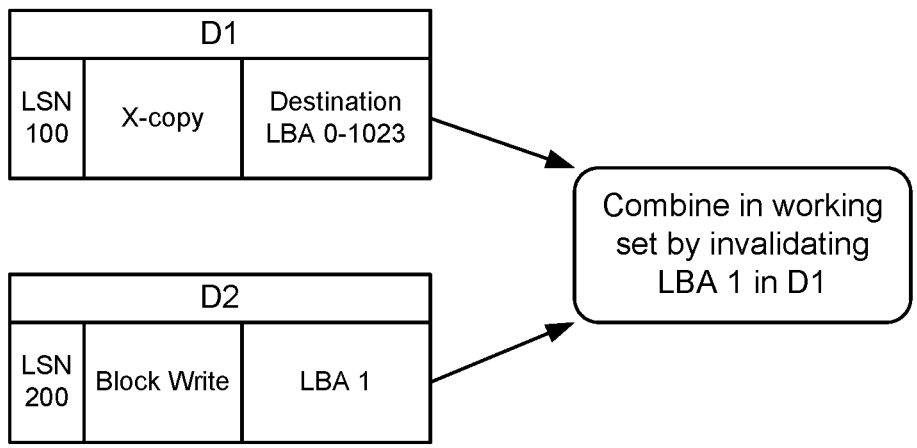
FIG. 3 is a block diagram showing an example arrangement for resolving multiple changes at a single LBA, one change for a per-extent x-copy and the other change for a subsequent per-block write.

FIG. 3 shows an example arrangement for resolving a per-extent x-copy descriptor D1 and a per-block write descriptor D2 that affects an LBA within the destination range of the x-copy, such that the two descriptors D1 and D2 may be flushed together in the same working set 250. The x-copy descriptor D1 specifies a destination LBA range of 0 to 1023, whereas the per-block write descriptor D2 specifies an LBA of 1, which falls within the x-copy destination range. The source range of the x-copy may also be specified, but it is not relevant to this example. As indicated by the LSNs, the x-copy (LSN 100) is earlier in time than the block write (LSN 200).

As shown to the right of FIG. 3, the log manager 140 may place the two descriptors D1 and D2 placed together in a single working set 250 by invalidating LBA 1 in the destination range of the x-copy. In an example, each extent of the x-copy destination range has an associated x-copy bitmap (not shown) which includes, for example, 256 bits (one bit per block, with this example assuming 4 kB blocks and 1 MB extents). Four x-copy bitmaps may be involved in D1, given that the destination range covers four extents. Setting the bit corresponding to LBA 1 to "0" provides a signal to ignore LBA 1 when performing the indicated x-copy. For instance, system components responsible for implementing changes indicated by flushed descriptors 160 are programmed to respond to the bitmaps by performing the indicated action on blocks having bitmap values of "1" but to take no action for blocks having bitmap values of "0."

Thus, by invalidating LBA 1 in the x-copy specified by D1, descriptors D1 and D2 may be flushed together in a single working set 250, where their specified changes may be implemented in parallel and in any actual order. If the per-block write hits the backend first, it is not overwritten by the x-copy. If the x-copy hits the backend first, it will not affect LBA 1 and the subsequent block write to LBA 1 will establish the proper value. Corruption is thereby avoided.

Figure 4:
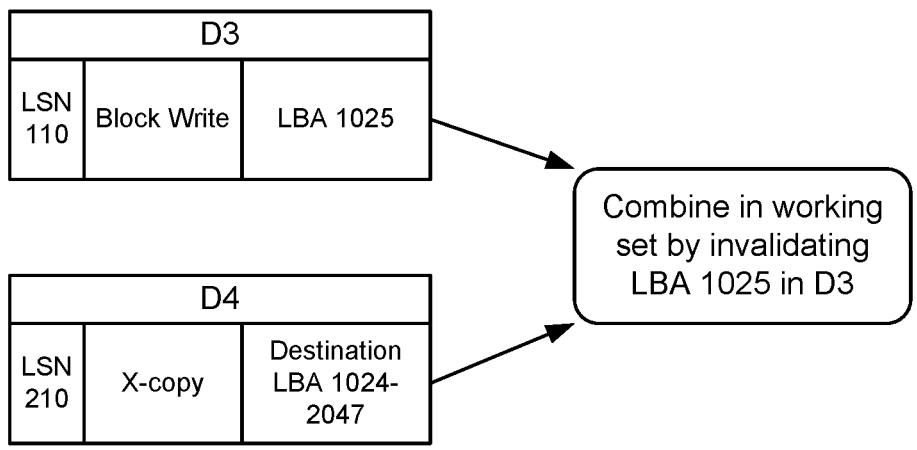
FIG. 4 is a block diagram showing an example arrangement for resolving multiple changes at a single LBA, one change for a per-block write and the other change for a subsequent per-extent x-copy.

FIG. 4 shows a similar example to FIG. 3, except that in this case a per-block write (D3) is first in time (LSN 110) and an x-copy (D4) is second in time (LSN 210). The per-block write of D3 is directed to LBA 1025, which falls within the destination range of the x-copy D4 (1024-2047). As the x-copy is second in time, the proper result is for the x-copy of D4 to overwrite the results of the per-block write D3. To ensure that this happens, the log manager 140 may invalidate the per-block write to LBA 1025 in D3. For example, per-block bitmaps may be provided, one bitmap per extent, similar to the x-copy bitmaps described above. By setting the bit corresponding to LBA 1025 to "0" in the associated per-block bitmap, the backend is alerted to ignore that per-block write specified by D3 and the two descriptors D3 and D4 may be flushed together in parallel. If D3 hits the backend first, it is ignored and LBA 1025 is overwritten by the subsequent x-copy of D4. If D4 hits the backend first, the block write of D3 is also ignored, such that the end result is the same. Once again, corruption is avoided.

Figure 5:
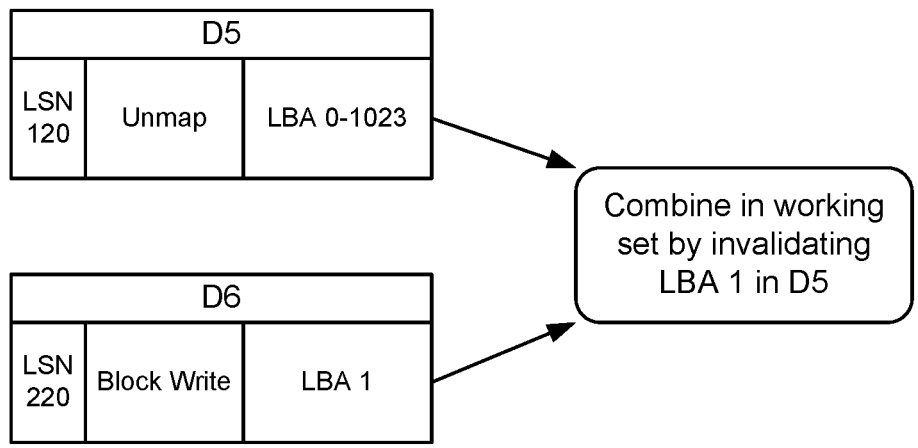
FIG. 5 is a block diagram showing an example arrangement for resolving multiple changes at a single LBA, one change for a per-extent unmap and the other change for a subsequent per-block write.
Figure 6:
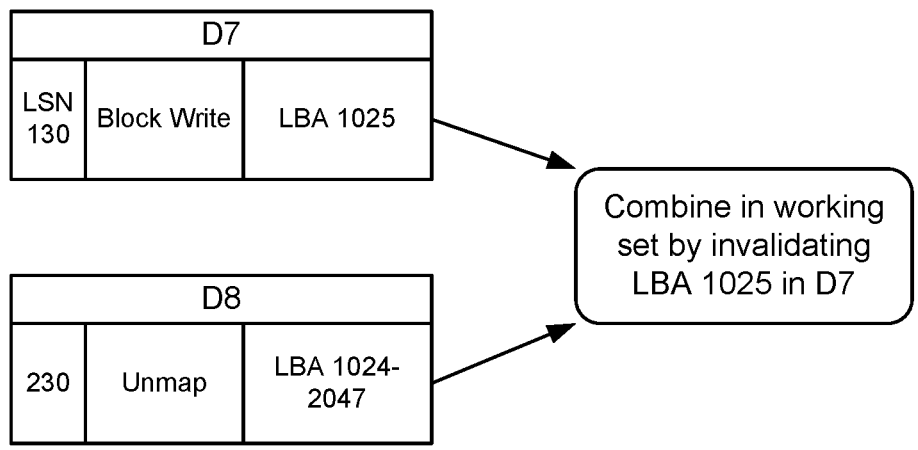
FIG. 6 is a block diagram showing an example arrangement for resolving multiple changes at a single LBA, one change for a per-block write and the other change for a subsequent per-extent unmap.

FIGS. 5 and 6 show similar examples to FIGS. 3 and 4, but in this case the x-copy descriptors have been replaced with unmap descriptors. In FIG. 5, an unmap descriptor D5 occurs earlier in time (LSN 120) than a block write specified by D6 (LSN 220). The block-write descriptor D6 specifies an LBA of 1, which falls within the LBA range of the unmap (0-1023). Here, the two descriptors D5 and D6 may be combined within a single working set 250 by invalidating LBA 1025 in D3. For example, unmap bitmaps may be provided, similar to the x-copy and per-block bitmaps described above.

The bit corresponding to LBA 1 maybe set to "0" in the corresponding unmap bitmap, which signals the backend to ignore LBA 1 when performing the unmap. The two descriptors D5 and D6 may then be flushed together in parallel. If D5 hits the backend first, it performs the unmap on LBAs 0 and 2 through 1023, but not on LBA 1, and the write is then performed as specified by D6. If D6 hits the backend first, the write is performed at LBA 1, but LBA 1 is not unmapped when D5 hits the backend later. Thus, the result is the same regardless of which change is processed first, and the two descriptors D5 and D6 may be flushed together in parallel without the risk of corruption.

FIG. 6 is similar to FIG. 5, but here the block write in D7 is first in time (LSN 130), whereas the unmap D8 is second (LSN 230). The block write in D7 specifies an LBA of 1025, whereas the unmap in D8 specifies an LBA range of 1024 to 2047. The proper result is thus to unmap the entire range from 1024 to 2047, including LBA 1025.

Here, the two descriptors D7 and D8 may be combined in a single flush working set 250 by invalidating the block write (LBA 1025), e.g., by setting a bit for LBA 1025 to "0" in the associated per-block bitmap provided for the extent that includes LBA 1025. If D7 hits the backend first, the write to LBA 1025 is ignored and the subsequent unmap of D8 applies to the entire range 1024-2047, unmapping LBA 1025 along with the other indicated LBAs and achieving the proper result. If D8 hits the backend first, the unmap over the entire range will proceed and the later write of D7 will be ignored. Thus, the same result follows regardless of backend timing and corruption is avoided.

Figure 7:
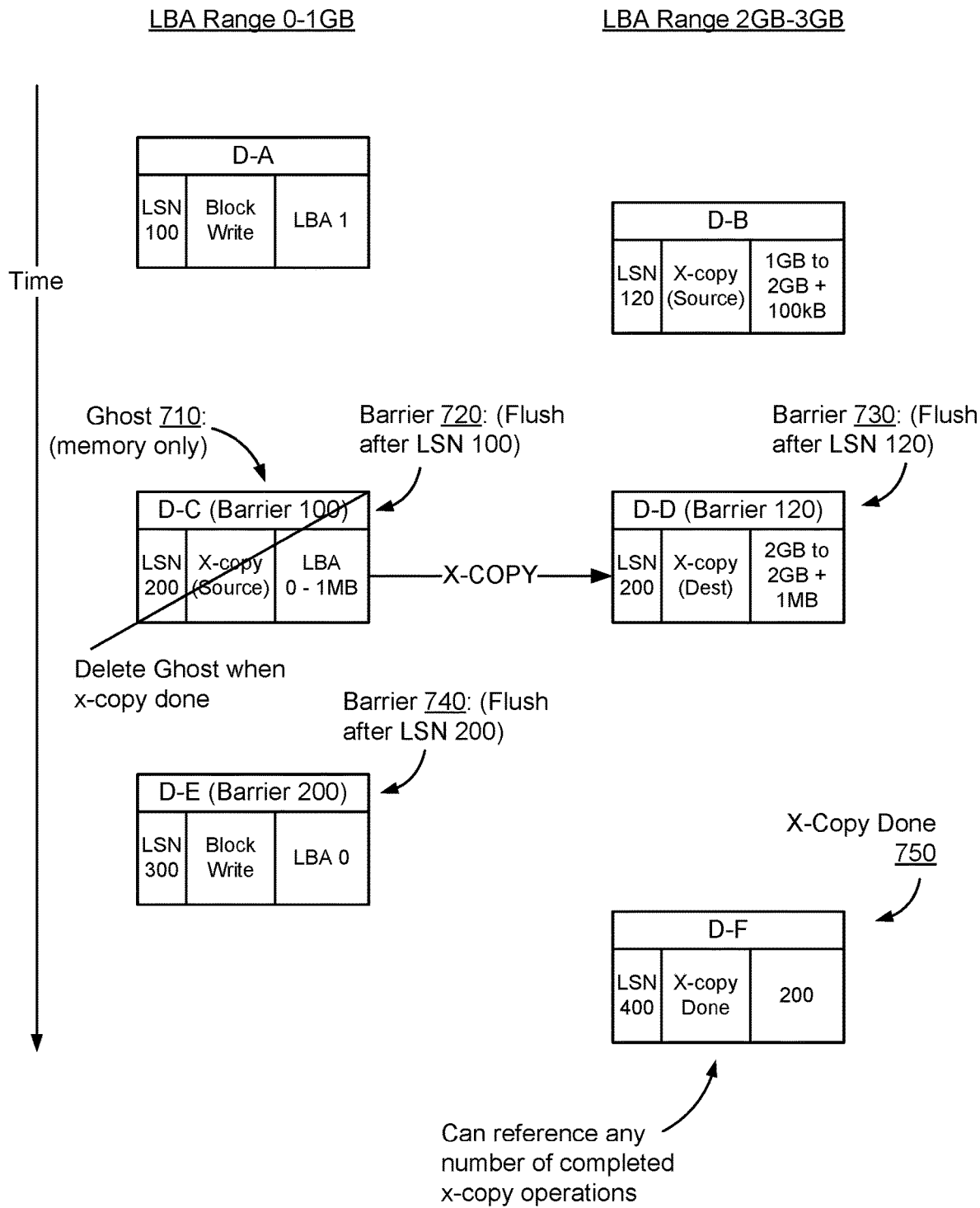
FIG. 7 is a timing diagram showing an example arrangement for identifying dependencies among descriptors and enforcing separation of certain descriptors into different flushing cycles.

FIG. 7 shows an example arrangement in which data dependencies may result in the log manager 140 separating certain descriptors 160 between or among different working sets 250. Here, six descriptors 160 are shown, D-A, D-B, D-C, D-D, D-E, and D-F. These descriptors are ordered in time (LSN), with D-A occurring before D-B, D-B occurring before D-C, and so on. In the figure, time increases in the down direction. Two LBA domains are shown horizontally, one LBA domain extending from 0 to 1 GB (on the left), and the other LBA domain extending from 2 GB to 3 GB (on the right).

An x-copy operation is shown in the middle of the figure, as represented by a pair of descriptors D-C and D-D. Descriptor D-C represents the source range of the specified x-copy operation, and descriptor D-D represents the destination range of the same x-copy operation. Although only one descriptor is typically provided for a single operation, the log manager 140 in this case has added descriptor D-C for the x-copy source range to the log 150 as a "ghost" descriptor 710, which may be useful to the log manager 140 in identifying and enforcing dependencies. The LSN of the ghost descriptor 710 may be the same as that of the corresponding x-copy destination descriptor (LSN 200). In an example, the ghost descriptor 710 (descriptor D-C) is present only in the in-memory instance 150 of the log, but not in the persistent instance 150p, as the log manager 140 may regenerate the ghost descriptor 710 as needed when performing recovery. The log manager 140 may also delete the ghost descriptor 710 from the in-memory version 150 of the log once it receives confirmation that the x-copy operation indicated by the ghost descriptor 710 has been completed. Such confirmation may be implicit once the descriptors for the indicated x-copy operation have been flushed. Alternatively, such confirmation may be received explicitly from the backend, e.g., from processing components that manage changes to the data/metadata 170.

A significant constraint on x-copy descriptors is that any changes specified by previous descriptors in the log that affect the source range indicated by the x-copy descriptors must be flushed before the x-copy descriptors can be flushed. X-copy typically operates by copying mapping pointers rather than data. Thus, to allow previously defined changes in the source range to be flushed at the same time as the x-copy source range could corrupt the x-copy results. For similar reasons, the x-copy source range must be kept stable from the time the x-copy is started until the time it is completed.

In an example, the log manager 140 satisfies these constraints at least in part by providing a barrier 720 with the ghost descriptor 710. The barrier 720 identifies previous descriptors 160 currently in the log 150 that affect the x-copy source range (0 to 1 MB).

In this case, the barrier 720 identifies LSN 100, which corresponds to descriptor D-A, a single-block write to LBA 1. When the log manager 140 is assembling the next working set 250, the barrier 720 informs the log manager 140 to flush the indicated descriptor (D-A at LSN 100) before it flushes the x-copy (descriptors D-C and D-D). In this manner, the log manager 140 delays flushing of the x-copy descriptors (D-C and D-D) until after it has flushed descriptor D-A. Rather than being flushed in the same working set 250, descriptor D-A is flushed in one working set and descriptors (D-C and D-D) are flushed in another (later) working set.

It is further necessary to protect the source range of the x-copy operation from changes until the x-copy is completed. Thus, flushing of subsequent descriptors that affect the x-copy source range may themselves be delayed until later flush cycles, after the x-copy operation is complete. Here, for example, descriptor D-E specifies a block-write to LBA 0, which falls within the source range of the x-copy descriptor D-C (the ghost). Accordingly, descriptor D-E may include a barrier 740, which refers back to the x-copy (LSN 200), and signals the log manager 140 that descriptor D-E must be flushed in a later flush cycle than descriptor D-C. In this manner, the x-copy source range is protected from corruption.

Dependency-imposed constraints may also apply to the x-copy destination, as indicated by descriptor D-D. For example, if the x-copy destination range (2 GB to 2 GB+1 MB) itself includes any part of a source range of a previous per-extent descriptor (e.g., x-copy or snapshot), then flushing the x-copy descriptor D-D may be delayed until after the previous descriptor is flushed. Here, descriptor D-B specifies an x-copy source descriptor (for a different x-copy). As a portion of the source range specified by D-B falls within the x-copy destination range of D-D, descriptor D-D may include a barrier 730 (LSN 120), which identifies a dependency on D-B. In this manner, the log manager 140 delays the flushing of D-D until a later flush cycle, after D-B has been flushed.

After the x-copy specified by D-C and D-D has been flushed and is completed, the log manager 140 may write a new "x-copy-done" descriptor 750 (D-F) to the log 150, indicating that the x-copy is complete. This x-copy-done descriptor 750 may identify the subject x-copy operation by reference, such as LSN (200), which in this case refers to descriptors D-C and D-D. If multiple x-copy operations have been completed (as specified by different pairs of descriptors), the x-copy-done descriptor may list multiple LSNs, one for each x-copy operation. Significantly, the x-copy done descriptor 750 is stored both in the in-memory instance 150 of the log and in the persistent instance 150p.

Persistently storing the x-copy-done descriptor 750 avoids corruption that could otherwise arise if the storage system or node 120 experiences a failure or reboot, such that the in-memory instance 150 of the log is lost. Although descriptors 160 in the in-memory version 150 of the log may be invalidated once they have been flushed, the same invalidation generally is not performed in the persistent instance 150p of the log, as doing so would unnecessarily amplify writes. Thus, if a reboot occurs, descriptors for completed x-copy operations may still be found in the persistent instance 150p of the log and could be replayed. Replaying the x-copy operation would likely result in corruption, however, as there is no way of knowing whether the source LBA ranges of those x-copy operations have since been changed. In general, x-copy operations cannot be repeated, as long as there is a possibility that the source ranges have changed. The x-copy-done descriptor 750 avoids this scenario, as it may be read from the persistent instance 150p of the log and used to invalidate any associated x-copy descriptors in memory. In this manner, x-copy operations are not repeated after a reboot and associated corruption is avoided.

Figure 8:
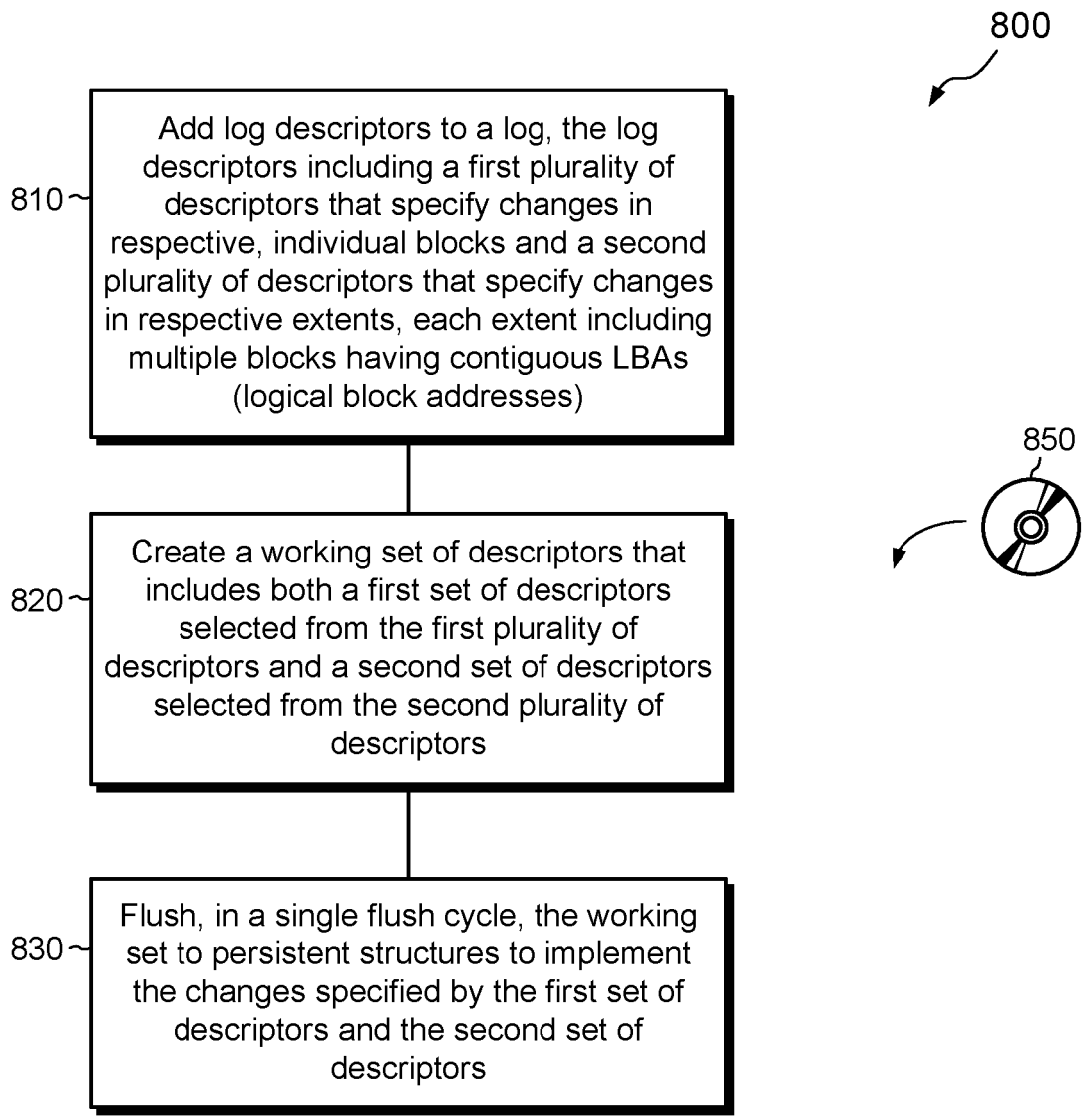
FIG. 8 is a flowchart showing an example method of managing a log.

FIG. 8 shows an example method 800 that may be carried out in connection with the environment 100 and provides a summary of some of the features described above. The method 800 is typically performed, for example, by the software constructs described in connection with FIG. 1, which reside in the memory 130 of the node 120a and are run by the set of processors 124. The various acts of method 700 may be ordered in any suitable way. Accordingly, embodiments may be constructed in which acts are performed in orders different from that illustrated, which may include performing some acts simultaneously.

At 810, log descriptors 160 are added to a log 150, the log descriptors 160 including a first plurality of descriptors 160a that specify changes in respective, individual blocks and a second plurality of descriptors 160b that specify changes in respective extents, each extent including multiple blocks having contiguous LBAs (logical block addresses).

At 820, a working set 250 of descriptors 160 is created, which includes both a first set of descriptors selected from the first plurality of descriptors 160a and a second set of descriptors selected from the second plurality of descriptors 160b.

At 830, the working set 250 is flushed, in a single flush cycle, to persistent structures 170 to implement the changes specified by the first set of descriptors and the second set of descriptors.

An improved technique has been disclosed for managing a log 150 in a storage system 116. The technique includes adding descriptors 160 to the log 150, the descriptors 160 indicating changes in user data that affects metadata, and creating a working set 250 of descriptors 160 that includes both per-block descriptors 160a for specifying per-block changes and per-extent descriptors 160b for specifying per-extent changes, where an extent includes a range of contiguous blocks. The technique further includes flushing 260 the working set 250 in a single flush cycle, including flushing the per-block descriptors 160a together with the per-extent descriptors 160b.

Having described certain embodiments, numerous alternative embodiments or variations can be made. Although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 850 in FIG. 8). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing a log, comprising:
   adding log descriptors to the log, the log descriptors including a first plurality of descriptors that specify changes in respective, individual blocks and a second plurality of descriptors that specify changes in respective extents, each extent including multiple blocks having contiguous LBAs (logical block addresses);
   creating a working set of descriptors that includes both a first set of descriptors selected from the first plurality of descriptors and a second set of descriptors selected from the second plurality of descriptors; and
   flushing, in a single flush cycle, the working set to persistent structures to implement the changes specified by the first set of descriptors and the second set of descriptors.

2. The method of claim 1, wherein the second set of descriptors includes an x-copy descriptor that indicates an x-copy operation from a source range to a destination range.

3. The method of claim 2,
   wherein the descriptors in the log are time ordered using sequence indicators,
   wherein the log initially includes at least one descriptor that both (i) has an earlier sequence indicator than the x-copy descriptor and (ii) specifies a change in one or more LBAs that fall within the source range of the x-copy operation, and
   wherein the method further comprises delaying the flushing of the x-copy descriptor until there are no other descriptors in the log that both (i) have earlier sequence indicators than the x-copy descriptor and (ii) specify changes in one or more LBAs that fall within the source range of the x-copy operation.

4. The method of claim 3, further comprising delaying, until the x-copy operation has completed, flushing of at least one descriptor that both (i) has a later sequence indicator than the x-copy descriptor and (ii) specifies changes in one or more LBAs that fall within the source range of the x-copy operation.

5. The method of claim 4, further comprising creating a ghost descriptor in the log, the ghost descriptor indicating the x-copy source range and preventing the x-copy descriptor from being flushed until after a referenced previous descriptor affecting the x-copy source range has been flushed.

6. The method of claim 5, wherein the log includes an in-memory instance and a persistent instance, wherein creating the ghost descriptor include storing the ghost descriptor in the in-memory instance but not in the persistent instance, and wherein the method further comprises deleting the ghost descriptor from the in-memory instance based on the x-copy operation being completed.

7. The method of claim 3, wherein at least one LBA within the destination range of the x-copy operation is part of a source range indicated by another descriptor in the log that has an earlier sequence indicator than the x-copy descriptor, and wherein the method further comprises delaying the flushing of the x-copy descriptor until after the other descriptor has been flushed.

8. The method of claim 7, wherein the other descriptor in the log is a descriptor for a previous x-copy operation.

9. The method of claim 2, further comprising:
   detecting that the x-copy operation has completed; and
   inserting an x-copy-done descriptor into the log, the x-copy-done descriptor indicating that the x-copy operation has completed.

10. The method of claim 9, further comprising persisting the x-copy-done descriptor in a persistent instance of the log, the persisted x-copy-done descriptor preventing the x-copy operation from being repeated following a reboot.

11. The method of claim 2, wherein the first set of descriptors includes a block-write descriptor that specifies a write of a block to a target LBA, and wherein the target LBA falls within the destination range indicated by the x-copy descriptor.

12. The method of claim 11, wherein descriptors in the log are time ordered using sequence indicators, wherein the x-copy descriptor has an earlier sequence indicator than the block-write descriptor, and wherein the method further comprises invalidating the target LBA within the destination range indicated by the x-copy descriptor, such that a resulting x-copy operation does not update the target LBA.

13. The method of claim 1, wherein the second set of descriptors includes an unmap descriptor that specifies an unmap operation of an indicated LBA range, wherein the first set of descriptors includes a second block-write descriptor that specifies a write of a second block to a second target LBA, and wherein the second target LBA falls within the LBA range indicated by the unmap descriptor.

14. The method of claim 13, wherein descriptors in the log are time ordered using sequence indicators, wherein the unmap descriptor has an earlier sequence indicator than the second block-write descriptor, and wherein the method further comprises invalidating the second target LBA within the range indicated by the unmap descriptor, such that a resulting unmap operation does not update the second target LBA.

15. The method of claim 1, wherein the second set of descriptors includes both (i) an unmap descriptor that indicates an unmap operation of an indicated LBA range and (ii) an x-copy descriptor that indicates an x-copy operation from a source range to a destination range.

16. A computerized apparatus, comprising control circuitry that includes a set of processors coupled to memory, the control circuitry constructed and arranged to:

add log descriptors to a log, the log descriptors including a first plurality of descriptors that specify changes in respective, individual blocks and a second plurality of descriptors that specify changes in respective extents, each extent including multiple blocks having contiguous LBAs (logical block addresses);

create a working set of descriptors that includes both a first set of descriptors selected from the first plurality of descriptors and a second set of descriptors selected from the second plurality of descriptors; and flush, in a single flush cycle, the working set to persistent structures to implement the changes specified by the first set of descriptors and the second set of descriptors.

17. A computer program product including a set of non-transitory, computer-readable media having instructions which, when executed by control circuitry of a computerized apparatus, cause the computerized apparatus to perform a method of managing a log, the method comprising:

adding log descriptors to the log, the log descriptors including a first plurality of descriptors that specify changes in respective, individual blocks and a second plurality of descriptors that specify changes in respective extents, each extent including multiple blocks having contiguous LBAs (logical block addresses);

creating a working set of descriptors that includes both a first set of descriptors selected from the first plurality of descriptors and a second set of descriptors selected from the second plurality of descriptors; and flushing, in a single flush cycle, the working set to persistent structures to implement the changes specified by the first set of descriptors and the second set of descriptors.

18. The computer program product of claim 17, wherein the second set of descriptors includes an x-copy descriptor that indicates an x-copy operation from a source range to a destination range.

19. The computer program product of claim 17, wherein the second set of descriptors includes an unmap descriptor that specifies an unmap operation of an indicated LBA range, wherein the first set of descriptors includes a second block-write descriptor that specifies a write of a second block to a second target LBA, and wherein the second target LBA falls within the LBA range indicated by the unmap descriptor.

20. The computer program product of claim 17, wherein the second set of descriptors includes both (i) an unmap descriptor that indicates an unmap operation of an indicated LBA range and (ii) an x-copy descriptor that indicates an x-copy operation from a source range to a destination range.

* * * * *